United States Patent [19]

Mossman

[11] 4,131,821
[45] Dec. 26, 1978

[54] AGING RESISTANT MIXTURES IN BISTABLE STORAGE TUBES

[75] Inventor: Ralph A. Mossman, Portland, Oreg.

[73] Assignee: Tektronix, Inc., Beaverton, Oreg.

[21] Appl. No.: 831,019

[22] Filed: Sep. 6, 1977

[51] Int. Cl.² .............................................. H01J 29/39
[52] U.S. Cl. ..................................... 313/398; 313/391
[58] Field of Search ........................................ 313/398

[56] References Cited
U.S. PATENT DOCUMENTS 3,982,150  9/1976  Mossman ............................. 313/398

*Primary Examiner*—Robert Segal
*Assistant Examiner*—Darwin R. Hostetter
*Attorney, Agent, or Firm*—Adrian J. La Rue

[57] ABSTRACT

An admixture of yttrium oxide, or yttrium oxysulfide, or yttrium oxide or yttrium oxysulfide activated by a rare earth element and P1 phosphor having metal oxide particles adhered or bonded at random locations on the surfaces of the P1 phosphor particles provides a viewable bistable storage target for cathode ray tubes having increased operating life.

17 Claims, 9 Drawing Figures

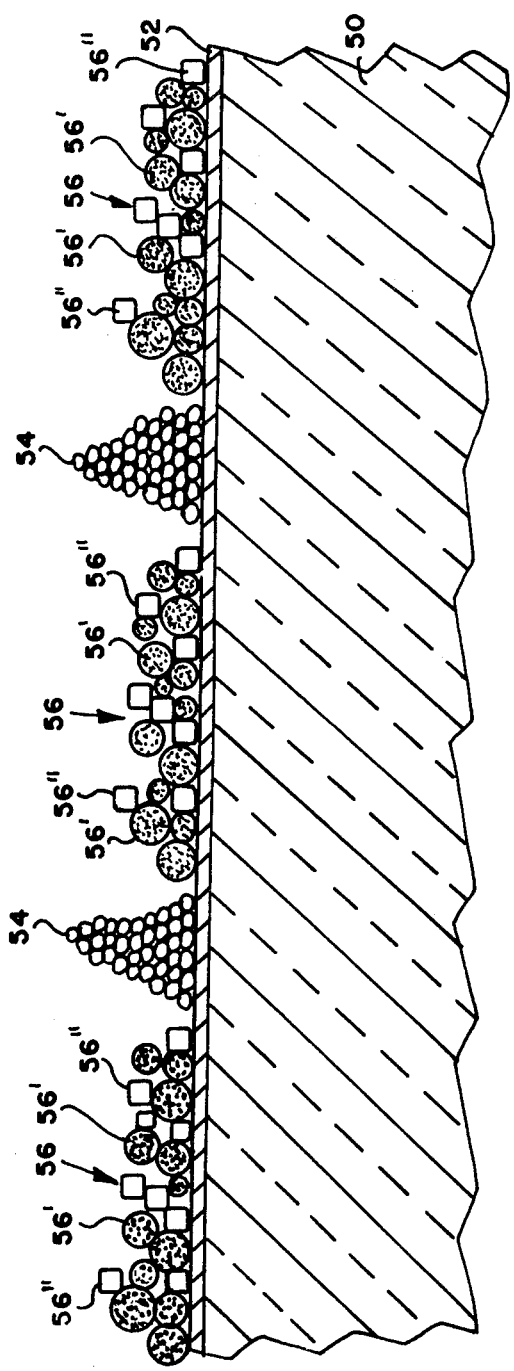
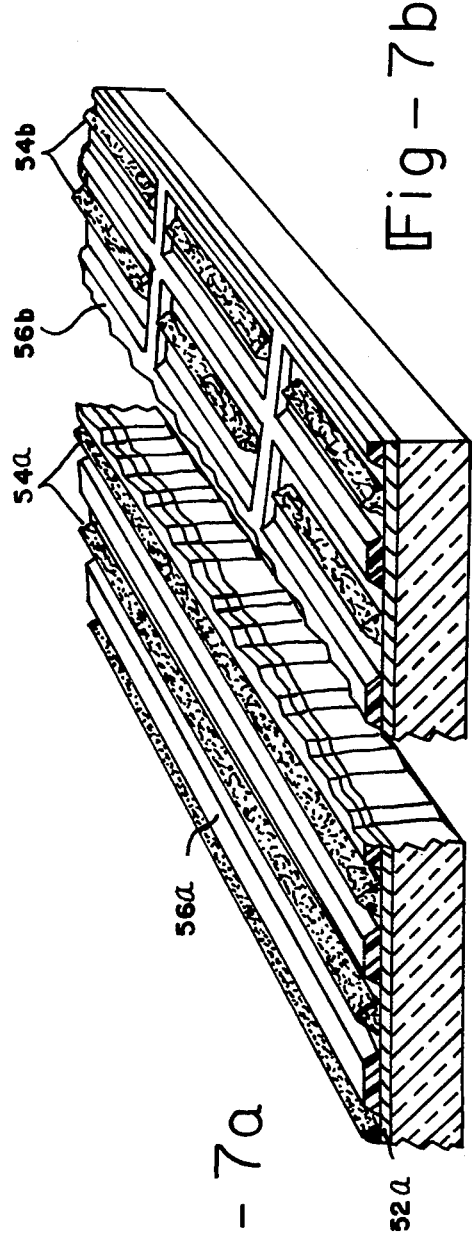

AGING RESISTANT MIXTURES IN BISTABLE STORAGE TUBES

BACKGROUND OF THE INVENTION

P1 phosphor is the dielectric material commonly used as a viewable bistable storage target for storage cathode ray tubes such as taught in U.S. Pat. Nos. 3,293,433; 3,293;474; 3,531,675 and U.S. patent application Ser. No. 356,029, filed Apr. 30, 1973. This phosphor dielectric material has been found to have desirable dielectric characteristics to enable information written thereon via a deflected cathode ray beam of electrons to be stored for any length of time until it is desired to erase such stored information. This P1 phosphor material can also be used to display information via the deflected beam of electrons in a non-store mode of operation. Hence, the phosphor material provides bistable operation in store or non-store modes of operation depending upon which mode of operation is desired, and brightness of the visible image formed on the phosphor layer as well as image contrast, writing speed and erase speed are important features attributed to P1 phosphor.

While P1 phosphor has provided excellent operating characteristics as a bistable storage target for cathode ray tubes, the operating life of such target is not as great as desired. Operating life of CRT targets are dependent upon operator use and uniformity of screen usage.

U.S. Pat. No. 2,241,939 discloses manganese-activated zinc orthosilicate (P1) phosphor that is mixed with metal oxides, some of which can be rare earth oxides, which mixture is then subjected to heat thereby forming a specialized sensitized phosphor material for use in a mercury lamp to provide higher luminance efficiency.

U.S. Pat. No. 3,862,450 teaches the concept of bonding or adhering secondary electron emissive material on the surface of phosphor storage dielectric particles that are used to form the storage dielectric phosphor layer of a storage target of a direct-viewing bistable storage tube. Such storage dielectric layer increases the writing speed of the storage target and also the life thereof, but the increased target life is not acceptable.

U.S. patent application Ser. No. 658,977, filed Feb. 18, 1976 discloses the use of an admixture of P1 phosphor particles and yttrium oxide, or yttrium oxysulfide, or rare earth activated yttrium oxide or yttrium oxysulfide to provide a bistable storage target of greater life than that of the storage target of pure P1 phosphor; however the target life is not as long as directed.

SUMMARY OF THE INVENTION

This invention relates to cathode ray tubes and more particularly to storage targets having increased operating life for use in cathode ray tubes.

The storage target comprises an admixture of P1 phosphor in the form of manganese-activated zinc orthosilicate having adhered or bonded thereto metal oxide material at random locations on the surfaces of the phosphor particles and yttrium oxide or yttrium oxysulfide or rare earth activated yttrium oxide or yttrium oxysulfide. Such a storage target provides longer operating life than P1 phosphor or metal oxide bonded to P1 phosphor or metal oxide bonded to P1 phosphor and admixed with rare earth oxides but with the operating characteristics thereof being substantially the same as a pure P1 phosphor target relative to luminance, image contrast, writing speed and erasure speed.

An object of the present invention is to provide viewable bistable storage targets for use in cathode ray tubes having increased operating life.

Another object of the present invention is the provision of a storage target which comprises an admixture of P1 phosphor having metal oxide bonded or adhered thereto at random locations on the surfaces of the phosphor particles and rare earth oxide or rare earth oxysulfide or rare earth activated rare earth oxide or rare earth oxysulfide.

A further object of the present invention is to provide a storage target that comprises an admixture of metal oxide material randomly adhered or bonded to P1 phosphor and yttrium oxide or rare earth activated yttrium oxide.

An additional object of the present invention is the provision of a CRT storage target which comprises an admixture of metal oxide material randomly adhered or bonded to P1 phosphor and yttrium oxysulfide or rare earth activated yttrium oxysulfide.

A still further object of the present invention is to provide a CRT storage target comprising an admixture of metal oxide material randomly adhered or bonded to P1 phosphor and rare earth oxide or rare earth oxysulfide which has substantially the same operating characteristics as a P1 phosphor storage target but has a longer operating life, due to a slower change in writing threshold, writing speed and operating range.

Still an additional object of the present invention is the method for making a storage target for a cathode ray tube.

BRIEF DESCRIPTION OF THE DRAWINGS

Other objects and advantages of the present invention will be apparent from the following detailed description of preferred embodiments thereof and from the attached drawings of which:

FIG. 6 is an enlarged cross section of a part of the storage target of FIG. 5.

FIG. 7a and 7b are broken perspective views of alternative embodiments of the storage target.

DETAILED DESCRIPTION OF THE INVENTION

The present invention will be described in conjunction with the target structure disclosed in U.S. patent application Ser. No. 356,029; however, it is to be understood that the admixture of metal oxide material randomly adhered or bonded to P1 phosphor (hereafter referred to as metal oxide — P1 phosphor) and rare earth oxide or rare earth oxysulfide or rare earth activated rare earth oxide or rare earth oxysulfide forming the dielectric can be used in conjunction with any other bistable storage CRT operating in the described same manner as the bistable storage targets described in the patents hereinabove.

Figure 1:
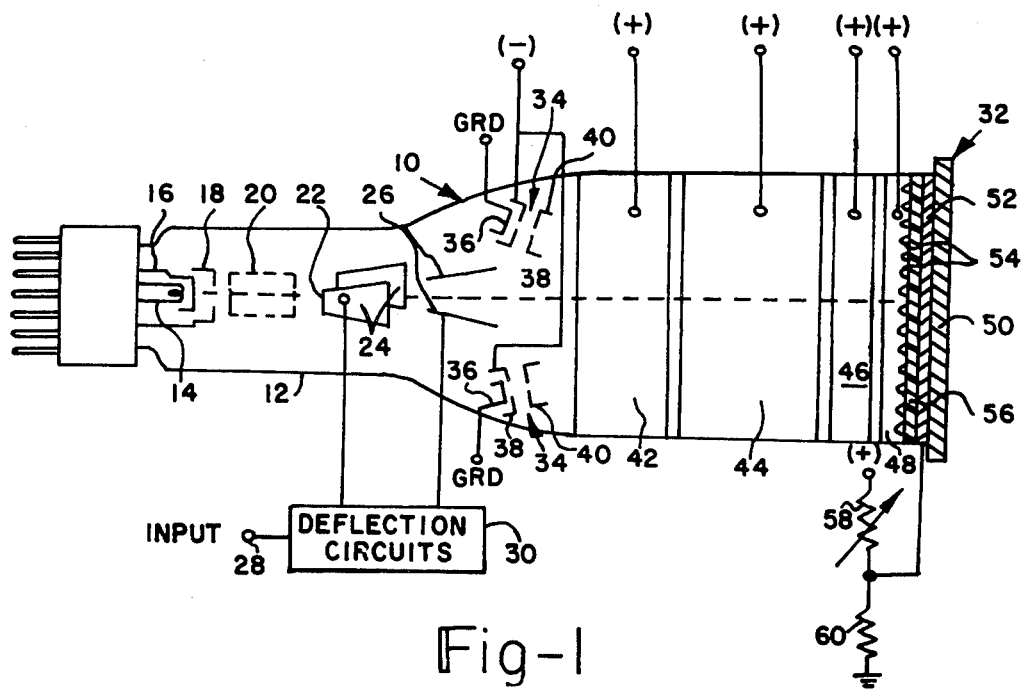
FIG. 1 is a schematic representation of a cathode ray storage tube according to the present invention.

Referring to FIG. 1, a cathode ray storage tube 10 includes an envelope 12 formed of insulating material which houses an electron gun including a filament 14, a cathode 16 for connection to a high negative voltage source, a control grid 18 and a focusing and accelerating structure 20. Electron beam 22 of high velocity electrons produced by the electron gun is deflected horizontally via horizontal deflection plates 24 and vertically by vertical deflection plates 26 in accordance with in input signal applied to input terminal 28 which operates conventional deflection circuits 30 connected to the horizontal and vertical deflection plates so that the electron beam is selectively positioned along storage target 32 at the end of envelope 12 opposite the electron gun in correspondence with the input signal. Alternatively, the electron beam can be deflected electromagnetically in accordance with conventional practice.

One or more flood electron guns 34 is provided in the storage tube, each flood gun including a cathode 36, a control grid 38 and an anode 40. Flood guns 34 are supported inside envelope 12 adjacent output ends of vertical deflection plates 26. Cathodes 36 are conventionally operated at a low voltage level which is typically ground level, whereas grids 38 are connected to a low negative voltage. Low velocity electrons emitted from flood guns 34 diverge into a conically-shaped beam and they are uniformly distributed over target 32.

A plurality of electrodes are disposed on the inner surface of envelope 12 between flood guns 34 and target 32. These electrodes are preferably provided as spaced coatings of conductive material and the first coating 42 functions primarily as a focusing electrode for the flood electrons emitted from the flood guns; it is connected to a suitable source of positive electrical potential. A second electrode wall coating 44 is spaced from coating 42; it is also electrically connected to a positive potential and functions as a focusing and collimating electrode. A third coating electrode 46 is spaced from coating 44, is connected to a positive potential and functions too as a focusing and collimating electrode. As a result of the collimating action of the electrode wall coatings, the electrons from the flood guns 34 are uniformly distributed over the surface of target 32.

A fourth electrode wall coating 48 is disposed between and spaced from wall coating 46 and storage target 32 and it is connected to positive voltage. Wall coating 48 also functions as a focusing and collimating electrode for the flood electrons as well as an auxiliary collector electrode to collect a small part of the secondary electrons emitted from storage target 32.

Electrons 42, 44, 46 and 48 are connected to descending positive potentials with the highest positive potential being connected to electrode 42 for optimum operation.

Storage target 32 comprises insulative end plate 50 having a transparent target or collector electrode 52 over which is disposed a series of conductive dots 54 in the form of a dot pattern and a dielectric layer 56. The insulative end plate 50 defines a support member and is made of transparent material, e.g. glass. Target electrode 52 is a thin transparent coating of preferably tin oxide which is suitably connected to the midpoint of a voltage divider which includes resistors 58 and 60 connected between a positive potential and ground. Resistor 58 is variable and is adjusted so that a proper operating voltage is applied to target electrode 52. Alternatively, target electrode 52 may be connected to amplifying means for providing an electrical readout of information stored on the storage target.

Dots 54 are conductive particles, preferably of cobalt, and have a substantially conical or cylindrical configuration which have their bases connected to electrode 52 and apices extending outwardly from the outer surface of dielectric layer 56. Dots 54 define collector electrodes and these dots and electrode 52 define collector electrode means which will be more fully described hereinafter and the dots can be configurations other than conical, e.g. pyramidal, triangular, etc. Dielectric layer 56 is a mechanical mixture of at least two compounds, one of which is a phosphor that is preferably P1 phosphor having a metal oxide, which is preferably magnesium oxide material, randomly adhered or bonded to the surfaces of the particles of P1 phosphor and the other is one of the following: $Y_2O_3$; $Y_2O_3{:}X$; $Y_2O_2S$ or $Y_2O_2S{:}X$ wherein X is any element from the group known as rare earth elements, e.g. terbium, europium, neodymium, lanthanum, etc. The metal oxide randomly adered or bonded to P1 phosphor is shown in FIG. 6 as round members 56' and the yttrium oxide, yttrium oxysulfide or rare earth activated yttrium oxide or yttrium oxysulfide is shown as square members 56''.

The preferred weight of metal oxide-P1 phosphor to that of rare earth oxide or rare earth oxysulfide or rare earth activated rare earth oxide or rare earth oxysulfide is about 75% to about 25%. The range of weight of rare earth oxide or rare earth activated rare earth oxide can be from about 10–25% to about 75–90% by weight of metal oxide-P1 phosphor; whereas the range of weight of rare earth oxysulfide or rare earth activated rare earth oxysulfide can be from about 10–90% to about 90–10% by weight of metal oxide-P1 phosphor.

Information is written on storage target 32 via electron beam 22, and it may be in the form of a waveform applied to vertical deflection plates 26 while the beam is scanned horizontally via horizontal deflection plates 24. In addition to electrical readout, the information written on the storage target is visibly displayed through transparent support member 50. During operation, the tube potentials are adjusted such that beam 22 has a relatively high velocity for writing and is capable of producing secondary electrons when it strikes storage dielectric 56. The area engaged by beam 22 is raised to the potential of collector electrodes 54 and target electrode 52 from ground level thus causing the dielectric target to phosphoresce thereat. These secondary electrons are then collected by collector electrodes 54, and the areas of storage dielectric engaged by beam 22 are positively charged so that flood electrons from flood guns 34 are attracted to these positively-charged areas; they emit secondary electrons at a ratio of greater than one therefrom, the secondary electrons being collected via collector electrodes 54 adjacent the positively charged (written) areas of storage dielectric 56 thereby causing the information to be visually observed and to remain indefinitely for purposes of study or being photographed. The target can be erased in a conventional manner by pulsing the target electrode to raise the storage dielectric to the potential of the collector electrodes and then lowering it to ground level so that the flood electrons maintain it thereat until beam 22 writes information thereon again. Reference is made to the heretofore identified U.S. Pat. Nos. 3,293,433; 3,293,474 and 3,531,675 for further information concerning the operation of bistable storage targets of this and similar construction.

Figure 2:
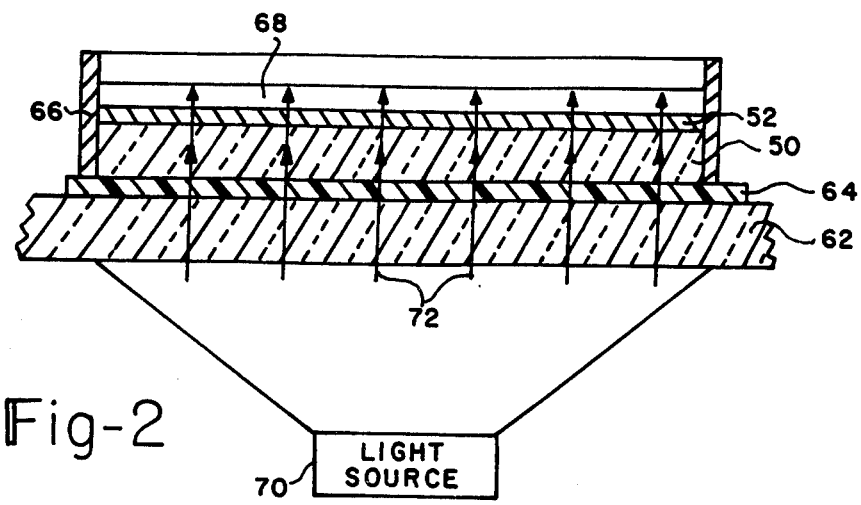
FIGS. 2–4 illustrate the fabrication of a storage target for use in a cathode ray tube.

Attention is directed to FIGS. 2–6 for a description of the fabrication of the storage target 32. As shown in FIG. 2, a transparent member 62 has a photomask 64 which has a hole pattern disposed thereon. Transparent support member 50 with transparent conductive layer 52 thereon is positioned on photomask 64. A frame 66 is disposed around the periphery of support member 50 and a photopolymerizable slurry 68 of polyvinyl alcohol, water, ammonium dichromate, cobalt powder (2-5 microns) and isopropyl alcohol is poured onto conductive layer 52.

Any fine conductive particles or particles that are made conductive other than cobalt can be used, but the particles that are darker with reduced reflective characteristics are more desirable for trace to background contrast. In the case of cobalt, it is black and provides optimum operational characteristics. The particles may also be of the same material as the conductive layer.

Collimated light source 70 is utilized to transmit light rays 72 through transparent member 62, the holes in photomask 64, support member 50, conductive layer 52 and into slurry 68 so that light activates slurry 68 thereby polymerizing the polyvinyl alcohol in these areas.

The frame 66 is removed and the target structure is washed with water which removes the non-activated slurry and leaves behind a pattern of cobalt dots.

Figure 3:
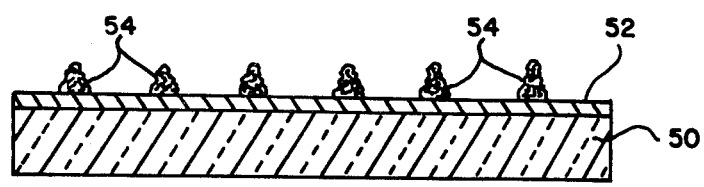
Figure 5:
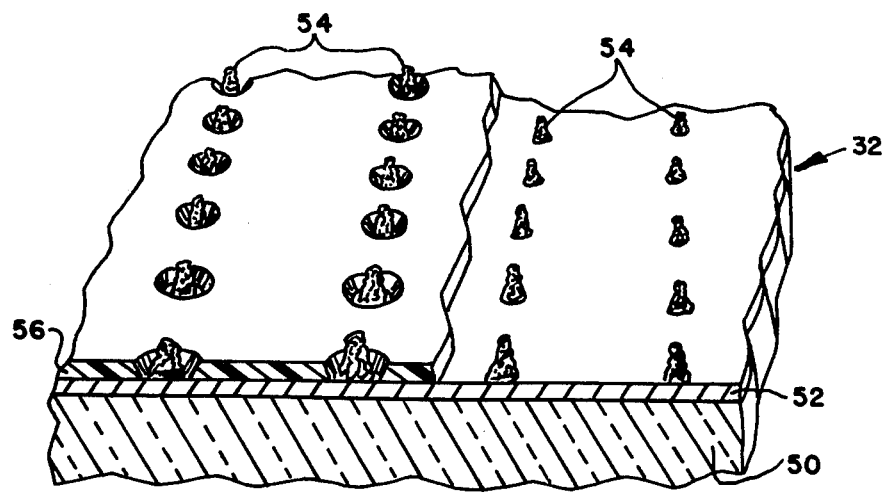
FIG. 5 is a perspective view, partly broken away and partly in cross section, of the completed storage target structure.

A shrinking agent is applied to the target structure such as acetone, aqueous ammonium sulfate, alcohols or other hydrophyllic agents and this shrinking agent shrinks the cobalt particles into a denser mass by rapid extraction of $H_2O$ thereby providing cobalt dots 54 defining a distinct dot pattern on conductive layer 52 as illustrated in FIGS. 3 and 5. The target structure is then dried.

P1 phosphor particles of between one and forty microns and MgO particles of less than one micron to submicron size are slurried together until an intimate mixture is formed; the MgO particles being about 10% by weight of the P1 phosphor particles. The MgO particles are randomly distributed over the surfaces of the P1 phosphor particles during slurrying. This mixture is dried and placed in an oven and fired in a neutral or oxidizing atmosphere to a temperature of between 600° C. and 1200° C. depending on size, density and percent of MgO and for such time that the MgO is fused into the P1 phosphor particles.

An alternative method to form metal oxide-P1 phosphor particles is slurrying the P1 phosphor particles in a salt of magnesium such as sulfate, nitrate, chloride, etc. The salt solution containing the P1 phosphor particles is dried and subsequently fired in an oxygen-containing atmosphere as described above which causes the decomposition of the metal salt to form MgO in situ at random locations on the surfaces of the P1 phosphor particles.

Figure 4:
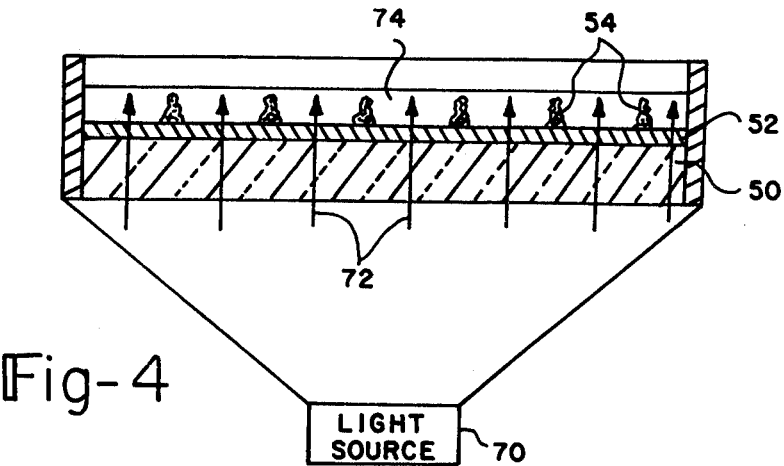

A photopolymerizable slurry 74 of polyvinyl alcohol, water, dimethyl sulfoxide, ammonium dichromate and a mixture of 75% by weight of P1 phosphor particles having adhered or bonded to their surfaces at random locations magnesium oxide with 25% by weight of one of the group of $Y_2O_3$; $Y_2O_3$:X, $Y_2O_2S$, $Y_2O_2S$:X with X being any element from the rare earth group is introduced onto conductive layer 52 and dots 54 as shown in FIG. 4, whereafter collimated light source 70 transmits light rays 72 through support member 50, conductive layer 52 and into slurry 74 and the light rays activate slurry 74 in the areas where no dots are located thereby polymerizing the polyvinyl alcohol in these areas.

As can be discerned, no photomask is needed for this operation because the conductive dots provide an integral photomask so that in the area of each conductive dot, no polymerization of the polyvinyl alcohol will take place.

The structure is washed with water which removes the nonactivated slurry and leaves behind a layer of light activated slurry defining a dielectric layer. This target structure can be soaked by the shrinking agent used to shrink the conductive particles of the dots, and this shrinking operation shrinks the dielectric layer into a more dense configuration so that the dielectric surrounding each dot is shrunk back away therefrom thereby exposing a large area of each dot. While the photopolymerizable material for formulating the pattern of conductive collector segments and dielectric layer is in the form of a slurry, it can be in the form of a photopolymerizable dry film. As can be discerned from FIGS. 5 and 6, the area of the storage dielectric layer 56 surrounding each of dots 54 slopes upwardly and away from the dots defining an annular surface 76 therearound and best defined as being in the form of a beveled hole hence the increased collector area provided by each collector dot 54 for more effectively collecting the secondary electrons. The outer ends of dots 54 also may extend above the outer surface of dielectric storage layer 56 about one-fourth the height of the dots, but these outer ends may be located in the plane containing the outer surface of storage layer 56 or even below this plane. The height of dots 54 will determine the collection efficiency of the secondary electrons.

After the storage target structure has been shrunk, it is baked in an oven at a suitable temperature to remove organic binders and leave the dielectric storage layer comprising essentially the dielectric storage phosphor material. The storage target is now completed and is assembled in position on envelope 12 in accordance with conventional frit-sealing techniques with the support member defining the faceplate.

FIG. 7a illustrates an embodiment of the storage target wherein the collector segments 54a of particulate conductive material are continuous and generally wedge-shaped protrusions that have their bases connected to conductive layer 52a and their apices extending above at the same level or below the outer surface of dielectric layer 56a. Thus, alternate rows of the dielectric layer and conductive collector segments define the target structure of FIG. 7a. Particulate collector segments 54b can also be discontinuous as illustrated in FIG. 7b, and the dielectric layer 56b is continuous in the areas where the collector segments are not continuous.

The areas of the dielectric layer 56a and 56b adjacent the collector segments 54a and 54b are beveled to provide greater collector area in the same manner as the collector dot pattern of FIGS. 2-6.

The target structures of FIGS. 7a and 7b are fabricated in the same manner as that of FIGS. 2-6 and the collector segments of conductive particles can take any configuration as desired to achieve the intended result.

Tests have been conducted on four types of bistable storage targets with the bistable storage layers being made of pure P1 phosphor, pure metal oxide-P1 phosphor, P1 phosphor mechanically admixed with yttrium oxide, yttrium oxysulfide or rare earth activated yttrium oxide or yttrium oxysulfide and metal oxide-P1 phosphor mechanically admixed with yttrium oxide, yttrium oxysulfide or rare earth activated yttrium oxide or yttrium oxysulfide. These tests involved writing information onto the entire display area of the storage targets and this information is repeatedly erased and rewritten so that the information appears at the same locations on the storage targets. These repetitive tests are conducted until the operating points of the cathode ray tubes are such that areas of the storage targets will no longer store information thereon. Such tests are known as life tests to determine the operating-life of a bistable storage target.

An average of ten storage targets of each type were tested and the average life of each type of storage target in hours is as follows:

| I. | Pure P1 phosphor | 220 Hours |
|---|---|---|
| II. | P1 Phosphor admixed with 25% of rare earth oxide or oxysulfide or rare earth activated rare earth oxide or oxysulfide. | 500 Hours |
| III. | Pure Metal Oxide-P1 Phosphor with 99% Magnesium Oxide | 1400 Hours |
| IV. | Metal Oxide-P1 Phosphor admixed with rare earth oxide or oxysulfide or rare earth activated rare earth oxide or oxysulfide. | 1700 Hours |

As can be discerned, the type IV storage targets provide the longest operating-life and this is important when it is necessary to use the bistable storage tubes to continuously display the same information at the same location.

It has been found that 9% of MgO fused onto the surfaces of the P1 phosphor particles will provide the storage targets with a luminance that is only slightly reduced from that of Type I P1 phosphor storage targets. If the percentage of MgO that is fused to the surfaces of P1 phosphor particles is increased, the operating life of the storage targets made from this material is increased but the luminance thereof is decreased.

Whereas P1 phosphor material has been used onto the surfaces of which the magnesium oxide is randomly adhered, oxygen-dominated phosphors such as silicates, aluminates and oxides and the like can be used. Metal oxides of the metals of Group IIA of the Periodic Table can be used in place of magnesium oxide.

The embodiments hereinbefore described are directed to a planar support member having the thin layer of conductive coating thereon and on which the conductive particles defining the collector dots or collector segments are connected to a conductive layer, a layer of dielectric storage material covers the conductive layer with the dielectric layer adjacent the dots or segments being provided with beveled surface means, and the apices of the dots or segments extending above the top or outer surface of the dielectric layer, at the same level as the outer surface or below the outer surface thereby defining a storage target of planar construction.

Figure 8:
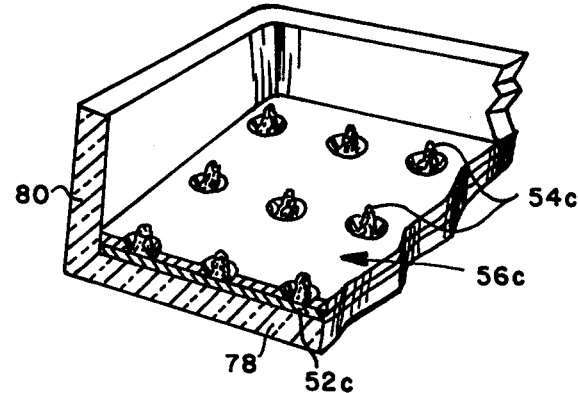
FIG. 8 is a perspective view of a corner of a front panel of a curved face plate for a large-viewing cathode ray tube.

In the embodiment of FIG. 8, a glass front panel 78 has curved inner and outer surfaces with the inner surface having conductive coating 52c, conductive collector dots 54c and dielectric layer 56c, which is fabricated in the same manner as hereinbefore described. Front panel 78 includes an integral wall 80 for securing onto the tube envelope of a larger cathode ray tube. Thus, the embodiment of FIG. 8 is directed to a curved storage target for use in conjunction with storage cathode ray tubes having a large viewing area.

The construction of the present dielectric target can also take the form as disclosed in U.S. Pat. No. 3,293,473 wherein the mixture of metal oxide-P1 phosphor and rare earth oxide or rare earth oxysulfide or rare earth activated rare earth oxide or rare earth oxysulfide dielectric material disposed on the conductive coating on the insulative support member is formed into a thin and porous dielectric to permit the secondary electrons, that are emitted from the written area of the target via the action of the flood gun electrons, to migrate through the porous dielectric layer so that these secondary electrons are collected by the conductive coating defining the collector electrode.

While preferred embodiments of the present invention have been illustrated and described, it will be apparent that changes and modifications may be made to this invention without departing therefrom in its broad aspects. The appended claims therefore cover all such changes and modifications as fall therewith.

The invention is claimed in accordance with the following:

1. A storage target for storing an electron image, comprising:
a nonconducting support member of electrical insulative material;
collector electrode means provided on one surface of said support member; and
a storage dielectric layer extending along said collector electrode means and containing a mixture including phosphor material having metal oxide material adhered at random locations over the surface of said phosphor material and rare earth material selected from the group consisting of a rare earth oxide, a rare earth oxysulfide and a rare earth activated rare earth oxide or oxysulfide, said metal oxide material being about nine percent by weight of said phosphor material.

2. A storage target according to claim 1 wherein said phosphor material is manganese activated zinc orthosilicate and said metal oxide is magnesium oxide.

3. A storage target according to claim 1 wherein said rare earth oxide is yttrium oxide.

4. A storage target according to claim 1 wherein said rare earth oxysulfide is yttrium oxysulfide.

5. A storage target according to claim 1 wherein said rare earth oxide is yttrium oxide and said activating rare earth is selected from any of the group of rare earth elements.

6. A storage target according to claim 1 wherein said rare earth oxysulfide is yttrium oxysulfide and said activating rare earth is selected from any of the group of rare earth elements.

7. A storage target according to claim 3 wherein said phosphor material having said metal oxide adhered thereto is about seventy-five to ninety percent by weight and said yttrium oxide is about ten to twenty-five percent by weight.

8. A storage target according to claim 1 wherein said phosphor material having said metal oxide adhered thereto is about ninety percent by weight and said selected rare earth material is about ten percent by weight.

9. A storage target according to claim 1 wherein said phosphor material having said metal oxide adhered thereto is about ten to ninety percent by weight and said rare earth oxysulfide or rare earth activated rare earth oxysulfide is about ten to ninety percent by weight.

10. A storage target according to claim 1 wherein said metal oxide is selected from the group of metals selected from the Group IIA metals of the Periodic Table.

11. A cathode ray storage tube, comprising:
an evacuated envelope;
a storage target mounted within said envelope including a conductive coating in contact with one side of an insulative support member and a storage dielectric layer in contact with said conductive coating, said storage dielectirc layer containing a mixture of phosphor material having metal oxide material adhered at random locations over the surface of said phosphor material and rare earth material selected from the group consisting of a rare earth oxide, a rare earth oxysulfide and a rare earth activated rare earth oxide or oxysulfide, said metal oxide material being about nine percent by weight of said phosphor material;
writing means mounted within said envelope for bombarding said storage target with a writing beam of high velocity electrons and for deflecting said writing beam across said storage target to produce an electron image in accordance with input information on said storage dielectric layer corresponding to said input information; and
holding means mounted within said envelope for bombarding said storage target substantially uniformly with low velocity electrons in order to cause said electron image to be stored bistably for an indefinite controllable time on said storage dielectric layer.

12. A cathode ray storage tube according to claim 11 wherein said phosphor material is manganese activated zinc orthosilicate and said metal oxide material is magnesium oxide.

13. A cathode ray tube storage tube according to claim 11 wherein said rare earth oxide is yttrium.

14. A cathode ray storage tube according to claim 11 wherein said rare earth oxysulfide is yttrium oxysulfide.

15. A cathode ray storage tube according to claim 11 wherein said rare earth of oxide or oxysulfide is yttrium and said activating rare earth is selected from any of said rare earth elements.

16. A cathode ray storage tube according to claim 13 wherein said phosphor material having said metal oxide adhered thereto is about 75 to 90 percent by weight and said yttrium oxide is about 10 to 25 percent.

17. A cathode ray storage tube according to claim 11 wherein said phosphor material having said metal oxide adhered thereto is about ten to ninety percent by weight and said rare earth oxysulfide or rare earth activated rare earth oxysulfide is about 10 to 90 percent by weight.

* * * * *

UNITED STATES PATENT AND TRADEMARK OFFICE
CERTIFICATE OF CORRECTION

PATENT NO. : 4,131,821
DATED : December 26, 1978
INVENTOR(S) : Ralph A. Mossman

It is certified that error appears in the above-identified patent and that said Letters Patent are hereby corrected as shown below:

Column 1, Line 1, change "RESISTANT MIXTURES" to --RESISTANT PHOSPHOR MIXTURES--.

Column 1, Line 50, change "directed" to --desired--.

Column 2, Line 25, change "fide which" to --fide or rare earth activated rare earth oxide or rare earth oxysulfide which--.

Column 3, Line 50, change "Electrons" to --Electrodes--.

Column 4, Line 19, change "adered" to --adhered--.

Column 7, Line 12, change "average life" to --average operating life--.

Signed and Sealed this

Twenty-ninth Day of May 1979

[SEAL]

Attest:

RUTH C. MASON
Attesting Officer

DONALD W. BANNER
Commissioner of Patents and Trademarks